United States Patent [19]

Kawashima

[11] Patent Number: 4,700,098
[45] Date of Patent: Oct. 13, 1987

[54] D.C. MOTORS WITH UNEQUAL POLE SPACING

[75] Inventor: Kinji Kawashima, Kisai, Japan

[73] Assignee: Sanyo Electric Co., Ltd., Japan

[21] Appl. No.: 813,769

[22] Filed: Dec. 27, 1985

[30] Foreign Application Priority Data

| Dec. 28, 1984 | [JP] | Japan | 59-275741 |
| Feb. 8, 1985 | [JP] | Japan | 60-23932 |
| Feb. 8, 1985 | [JP] | Japan | 60-23933 |
| Jun. 12, 1985 | [JP] | Japan | 60-127397 |
| Jul. 10, 1985 | [JP] | Japan | 60-151947 |
| Jul. 10, 1985 | [JP] | Japan | 60-151948 |

[51] Int. Cl.$^4$ .............................................. H02K 1/08
[52] U.S. Cl. ..................................... 310/186; 310/156
[58] Field of Search .............. 310/67 R, 154, 156, 310/186, 269; 318/254

[56] References Cited

U.S. PATENT DOCUMENTS

| 3,215,875 | 11/1965 | Latta | 310/269 |
| 3,374,410 | 3/1968 | Cronquist et al. | 310/49 R |
| 3,885,302 | 5/1975 | Boesel | 310/186 |
| 4,357,563 | 11/1982 | Ohno | 310/67 R |
| 4,451,752 | 5/1984 | Tahara | 310/186 |
| 4,644,233 | 2/1987 | Suzuki | 318/254 |

FOREIGN PATENT DOCUMENTS

| 563581 | 9/1958 | Canada | 310/156 |
| 117436 | 4/1958 | U.S.S.R. | 310/186 |

Primary Examiner—Patrick R. Salce
Assistant Examiner—D. L. Rebsch
Attorney, Agent, or Firm—Darby & Darby

[57] ABSTRACT

A rotary electric apparatus comprising a field magnet having different magnetic poles arranged alternately on a circumferential surface, an armature including an armature core having slots formed therein as distributed on a circumferential surface opposed to the magnetic circumferential surface, to provide salient poles between the slots, each of the salient poles having an armature winding wound therearound, and a shaft supporting either the armature or the field magnet rotatably, relative to the other. The magnetic poles of the field magnet or the slots of the armature core are formed at unequal spacings determined by some equations, so that positions where cogging occurs can be distributed.

17 Claims, 14 Drawing Figures combined

FIG. 6
(a)
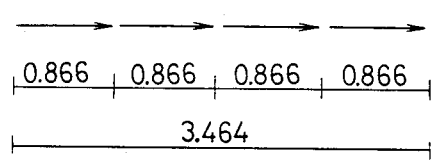
(b)
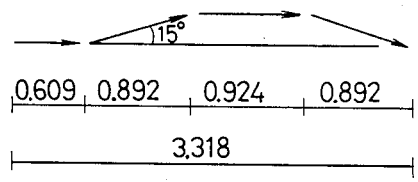
(c)
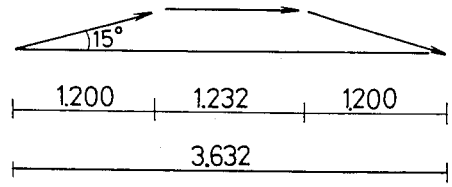

D.C. MOTORS WITH UNEQUAL POLE SPACING

BACKGROUND OF THE INVENTION

1. Field of the Invention

The present invention relates to rotary electric apparatus which are rotatable with precision and with minimized vibration and which are suitable as electric motors or generators, and more particularly to a rotary electric apparatus which comprises a field magnet and an armature with armature windings provided in the slots of its core and which is useful, for example, as a brushless motor for driving the head rotating cylinder of a video tape recorder.

2. Description of the Prior Art

With a conventional rotary electric apparatus which comprises, for example, an eight-pole field magnet and three-phase armature windings wound around 12 slotted portions of an armature core, 24 cogging phenomena occur per rotation of the armature relative to the field magnet.

FIG. 11 is a schematic front view showing the arrangement of the field magnet and the armature core of such a rotary electric apparatus which is a brushless electric motor. With reference to this drawing, the field magnet 1 serving as a rotor has eight poles, and the N poles are indicated by arrows toward the center, and the S poles by arrows in the centrifugal direction. The core 3 of the armature 2 serving as a stator has 12 slots 4 arranged at an equal spacing. Although not shown, the three-phase armature windings include four divided windings for each phase, with each divided winding wound around one salient pole. The four divided windings of each phase are wound in the same direction around the poles at a pitch of three slots.

In the illustrated case, the poles of the magnet 1 of the same polarity, e.g. N poles N1 to N4, are opposed to different slots 4 during rotation at the same time, so that the cogging forces combine to four times the single force. FIG. 12 shows variations in the cogging forces of the poles of the field magnet and variations in the combined cogging force thereof during ⅓ of a revolution.

As will be apparent from the diagram, the poles of the same polarity of the magnet 1 undergo cogging at the same angle of rotation, and the combined cogging force is four times the cogging force of each pole and is therefore a great value.

It appears possible to reduce the cogging force by diminishing the magnetic force of the magnetic poles, or by increasing the pole-to-pole distance between the field magnet 1 and the armature 2, but reduced efficiency and output will then result. Such prior art is disclosed, for example, in Examined Japanese Patent Publication No. SHO 49-8568.

SUMMARY OF THE INVENTION

This invention provides a rotary electric apparatus comprising an armature including an armature core and armature windings, the armature core having first salient poles and a plurality of second salient poles provided by slots formed therein as distributed on a circumferential surface, the first salient poles being equal in number to the number of phases of the armature windings and equidistantly spaced on the circumference, the second salient poles being arranged at an equal spacing between each two adjacent first salient poles, the slots on the opposite sides of each first salient pole being different in pitch angle from the slots on the opposite sides of each second salient pole, the armature windings being formed around the first and second salient poles or around the second salient poles only; a field magnet having different magnetic poles formed alternately at an equal spacing and arranged on a circumference to oppose the ends of the first and second salient poles; and a shaft supporting one of the armature and the field magnet rotatably relative to the other and holding the salient poles of the armature opposed to the field magnet with a predetermined gap provided therebetween.

The invention also provides a rotary electric apparatus comprising a field magnet having different magnetic poles arranged alternately at unequal spacings on a circumferential surface, an armature including an armature core having slots formed therein as distributed at an equal spacing on a circumferential surface opposed to the circumferential surface to provide salient poles between the slots, each of the salient poles having an armature winding wound therearound, and a shaft supporting one of the armature and the field magnet rotatably relative to the other and holding the salient poles of the armature opposed to the field magnet with a predetermined gap provided therebetween.

Thus, the armature windings on the armature core or the magnetic poles of the field magnet opposed thereto are provided as distributed at unequal spacings over a circumference, so that the magnetic poles of the field magnet will not be opposed to slots of the armature at the same time during the rotation of the field magnet relative to the armature, with the result that the cogging forces detected by the magnetic poles will not be added to one another. Accordingly, the combined cogging force of the field magnet resulting from its relative rotation is small in magnitude, while the cogging period is shortened. The apparatus is therefore rotatable more smoothly than conventional like apparatus.

The main object of the present invention is to provide a rotary electric apparatus which is diminished in cogging force, shortened in cogging period and improved in interlinkage magnetic flux efficiency and has a smoothly rotatable rotor.

BRIEF DESCRIPTION OF THE DRAWINGS

FIGS. 6 (a) to (c) are diagrams of vectors each representing the amount of interlinked magnetic flux of armature winding of one phase multiplied by the number of turns of the winding, (a) showing the vectors determined for conventional salient poles of equal pitch, (b) showing vectors determined for salient poles of first and second pitch angles as in the present invention, with windings provided at equal slot pitch, (c) representing an embodiment of the invention wherein salient poles of second pitch angle only have windings which are the same as above in the total number of conductors;

DESCRIPTION OF THE PREFERRED EMBODIMENTS

A first embodiment of the present invention will be described with reference to some of the drawings.

Figure 1:
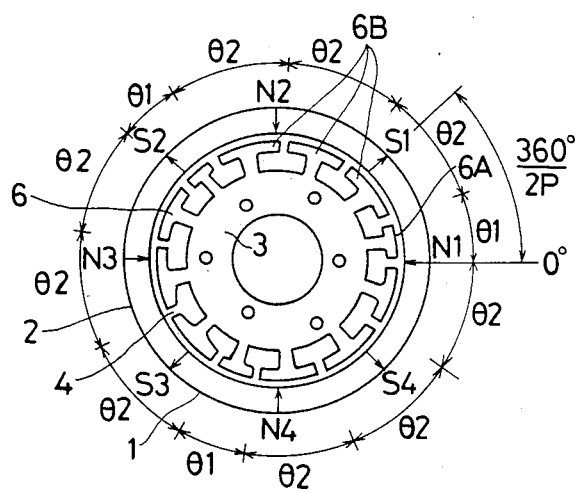
FIG. 1 is a schematic front view of a first embodiment of the present invention to illustrate the arrangement of a field magnet and an armature core.
Figure 11:
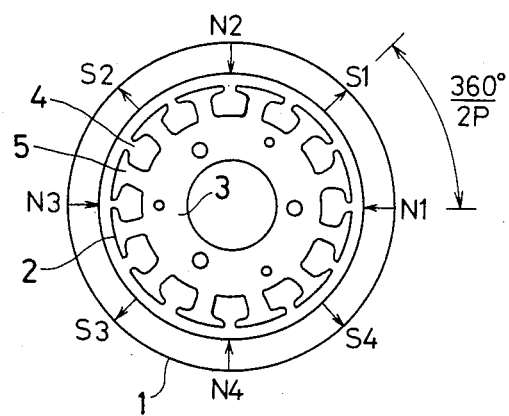
FIG. 11 is a schematic front view corresponding to FIG. 1 and showing a conventional apparatus.

FIG. 1 is a diagram showing the arrangement of field magnet and armature core of a rotary electric apparatus which is a brushless electric motor wherein the outer component is rotatable. This drawing corresponds to FIG. 11 showing a conventional apparatus, so that like parts are designated by like reference numerals or symbols in these drawings. A field magnet 1 serving as a rotor as the outer rotatable component has eight poles. The core 3 of an armature 2 serving as a stator has twelve slots 4 and salient poles 6. The armature 2 has three-phase armature windings, which are not shown for simplified illustration. The three-phase windings include four divided windings for each phase. Each of the divided windings is formed around one salient pole 6. In this case, the divided windings of the same phase are wound in the same direction around the salient poles at a pitch of three slots and are connected together in series.

The salient poles 6 are divided into two kinds: salient poles 6A formed by slots with a first pitch angle of 18.75 degrees ($\theta 1$) on the opposite sides thereof, and salient poles 6B with a second pitch angle of 33.75 degrees ($\theta 2$). Three first salient poles 6A, equal in number to the number of phases, are arranged at an equal spacing on the circumference of the armature core 3. Three second salient poles 6B are arranged between each two adjacent first salient poles 6A.

Accordingly, when the field magnet 1 rotates counterclockwise from the position of FIG. 1 relative to the armature, the magnetic poles N1 to N4 and S1 to S4 of the field magnet 1 produce cogging at the rotational angles given in Table 1.

With respect to the rotational angle where the magnetic pole N1 produces cogging, like angle of the pole S1 adjacent to the pole N1, e.g. the rotational angle 7.5 degrees in Table 1, line 1 is calculated from $\theta 1 \times \theta 2 - 360 \times \frac{1}{8} = 18.75 + 33.75 - 45$, since the two poles are spaced apart by $45(=360 \times \frac{1}{8})$ degrees. Similarly, the rotational angles given in line 2 et seq. can be determined. The cogging-occurring rotational angles can be determined likewise for the other poles N2 to N4 and S2 to S4. Table 1 shows cogging occurring angles of rotation thus determined.

Figure 2:
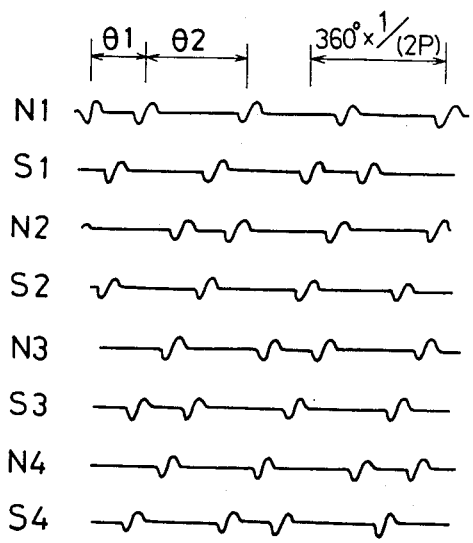
FIG. 2 is a diagram showing variations in the cogging forces of the magnetic poles of the field magnet shown in FIG. 1 and variations in the combined cogging force thereof.
Figure 12:
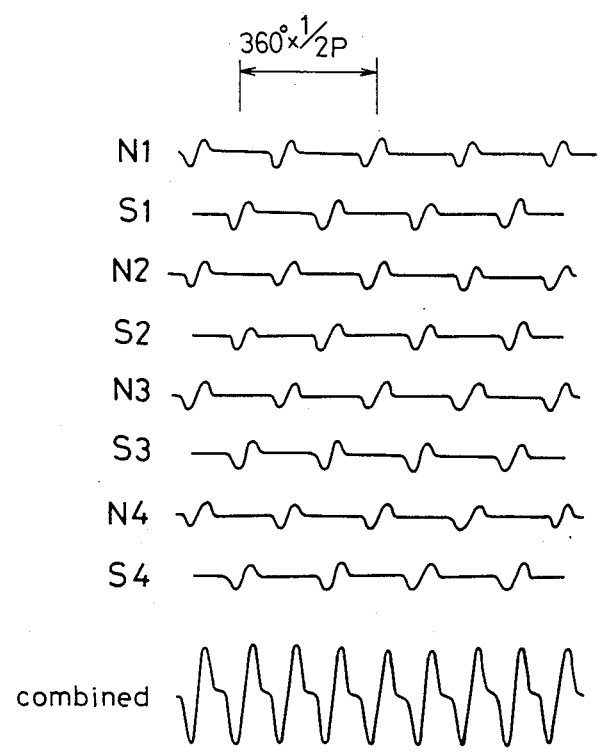
FIG. 12 is a diagram corresponding to FIG. 2 and showing the characteristics of the conventional apparatus.

The table shows that cogging occurs at rotational angles which are distributed at 96 positions per revolution. FIG. 2 shows variations in the cogging forces of the magnetic poles and variations in the combined cogging force thereof during $\frac{1}{8}$ of a revolution. The rotational angle is plotted as abscissa vs. the magnitude of cogging force as ordinate. As will be apparent from the diagram, the angles of rotation where cogging occurs (hereinafter referred to sometimes as "cogging angles") during the revolution of the poles are distributed, so that the combined cogging force is $\frac{1}{4}$ of the value shown in FIG. 12 for the conventional apparatus, with the period of cogging reduced to $\frac{1}{4}$ of the conventional period. Thus, the adjacent cogging forces are offset to give a reduced force.

While the above embodiment comprises an armature core having twelve salient poles and three-phase armature windings, and an eight-pole field magnet, a rotational electric apparatus will be considered which comprises an armature core having Z salient poles and N-phase (Z/N≠multiple of N) armature windings, and a field magnet having 2P poles. With this apparatus, the pitch angle of the slots on opposite sides of the first salient pole, i.e., $\theta 1$, and the pitch angle of the slots on opposite sides of the second salient pole, i.e., $\theta 2$, are given by the following equations.

$$\theta 1 = 360 \times \left\{ \frac{1}{Z} \pm \left( \frac{1}{2PN} - \frac{1}{2PZ} \right) \right\} \quad (1)$$

$$\theta 2 = 360 \times \left( \frac{1}{Z} \mp \frac{1}{2pZ} \right) \quad (2)$$

When "+" is used as "±" of Equation (1), "−" is used as "∓" of Equation (2). When "−" is used for Equation (1), "+" is used for Equation (2).

In this case, the positions where cogging occurs can be distributed to 2P·Z positions per revolution of the field magnet relative to the armature.

Table 2 shows the cogging-occurring positions in terms of rotational angles in a second embodiment wherein N, P and Z of Equations (1) and (2) are in a different combination. In this case, N=3, 2P=10, Z=15, $\theta 1$=33.6 degrees, and $\theta 2$=21.6 degrees. Cogging takes place at 150 distributed positions.

Figure 3:
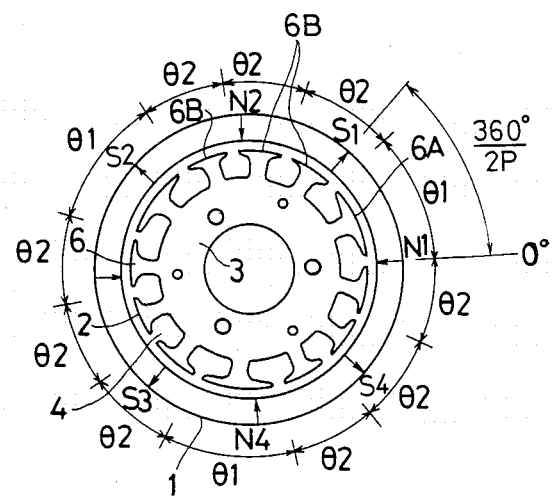
FIG. 3 is a schematic front view of a third embodiment of the present invention to illustrate the arrangement of a field magnet and an armature core.

FIG. 3 is a schematic diagram of a third embodiment of the present invention to illustrate the arrangement of a field magnet and an armature core. This drawing corresponds to FIG. 1, so that like parts are referred to by like numerals or symbols in these drawings.

With reference to FIG. 3, the field magnet 1 has 8 poles, and the core 3 of the armature 2 has twelve slots 4 and salient poles 6. The armature 2 has three-phase armature windings, which are not shown for simplified illustration. The windings include four divided windings for each phase. Each of the divided windings is formed around one salient pole 6. In this case, the divided windings of the same phase are wound in the same direction around the salient poles concerned at a pitch of three slots and are connected together in series.

The salient poles 6 are divided into two kinds: first salient poles 6A formed by opposite slots with a pitch angle of 41.25 degrees ($\theta 1$), and second salient poles 6B with a pitch angle of 26.25 degrees ($\theta 2$). Three first salient poles 6A are arranged at an equal spacing on the circumference of the armature core 3. Three second salient poles 6B are arranged between each two adjacent first salient poles 6A.

With respect to the cogging angle of the magnetic pole N1, like angle of the magnetic pole S1 adjacent to the pole N1, for example, the rotational angle 22.5 degrees thereof in Table 3, line 1 is calculated from $\theta1+\theta2-360\times\frac{1}{8}=41.25+26.25-45$, since the two poles are spaced apart by 45 ($=360\times\frac{1}{8}$) degrees. Similarly, the rotational angles given in line 2 et seq. can be determined. The cogging angles can be determined likewise for the other poles N2 to N4 and S2 to S4. Table 3 shows the cogging angles thus determined.

The table shows that the cogging angles are distributed at 96 positions per revolution.

While the above embodiment comprises three-phase armature windings and an eight-pole field magnet, a rotational electric apparatus will be considered which comprises N-phase (N being an odd number of at least 3) armature windings and a field magnet having 2P poles (P being an integer of not smaller than N/2). With this apparatus, the pitch angle $\theta1$ of the slots on opposite sides of the first salient pole and the pitch angle $\theta2$ of the slots on opposite sides of the second salient pole are given by the following equations.

$$\theta1 = 360 \times \frac{N \cdot P - 1}{2P \cdot N \cdot P} \text{ degrees} \quad (3)$$

$$\theta2 = 360 \times \frac{(2P - N) \cdot P + 1}{2P \cdot N \cdot P \cdot (P - 1)} \text{ degrees} \quad (4)$$

In this case, the positions where cogging occurs can be distributed to 2P·N·P positions per revolution of the field manget relative to the armature.

Next, a fourth embodiment of the present invention will be described with reference to FIG. 4.

Figure 4:
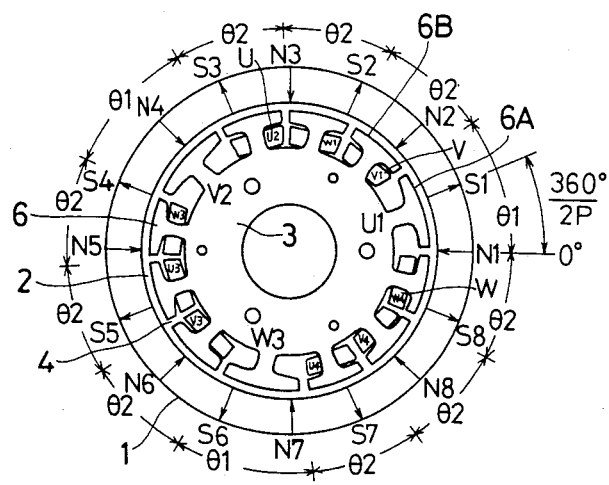
FIG. 4 is a schematic front view of a fourth embodiment of the present invention to illustrate the arrangement of a field magnet and an armature.

FIG. 4 is a schematic front view showing the arrangement of field magnet and armature of a rotary electric apparatus which is a brushless motor with a rotatable outer component. The drawing corresponds to FIG. 1, so that in these drawings, like parts are designated by like reference numerals or symbols.

The field magnet 1 serving as the outer rotor has 16 poles, while the core 3 of the armature 2 serving as a stator has twelve slots 4 and salient poles 6.

The salient poles 6 are divided into two kinds: salient poles 6A formed by opposite slots with a first pitch angle of 35.625 degrees ($\theta1$) and salient poles 6B with a second pitch angle of 28.125 degrees ($\theta2$). Three first salient poles 6A are arranged at an equal spacing on the circumference of the armature core 3. Three second salient poles 6B are arranged between each two adjacent first salient poles 6A and 6A.

The armature 2 has three-phase armature windings U, V and W, which include three divided windings U2, U3, U4, or V1, V3, V4, or W1, W2, W4 for each phase. Each divided winding is formed around one salient pole 6B. In this case, the divided windings of the same phase are formed on salient poles 6B with the second pitch angle which are positioned at a pitch of three slots as seen in FIG. 4 and are connected together in series. Accordingly, if the salient poles arranged at the 3-slot pitch include a salient pole 6A with the first pitch angle, the corresponding winding U1, V2 or W3 is not wound on the pole 6A. Consequently, if the armature windings are the same as the usual in the total number of conductors (in the armature resistance), each divided winding can be 12/9 times the usual one in the number of turns.

When the field magnet 1 rotates counterclockwise from the position of FIG. 4 relative to the armature, the magnetic pole N1 to N8 and S1 to S8 of the field magnet 1 produce cogging at the rotational angles given in Table 4.

With respect to the cogging angle of the magnetic pole N1, like angle of the magnetic pole S1 adjacent to the pole N1, e.g., the rotational angle 13.125 degrees thereof in Table 4, line 1 is calculated from $\theta1-360\times1/16=35.625-22.5$, since the two poles are spaced apart by 22.5 ($=360\times1/16$) degrees. Similarly, the rotational angles given in line 2 et seq. can be determined. The cogging-occurring rotational angles can be determined for the other poles N2 to N8 and S2 to S8 similarly. Table 4 shows these angles thus determined.

Figure 5:
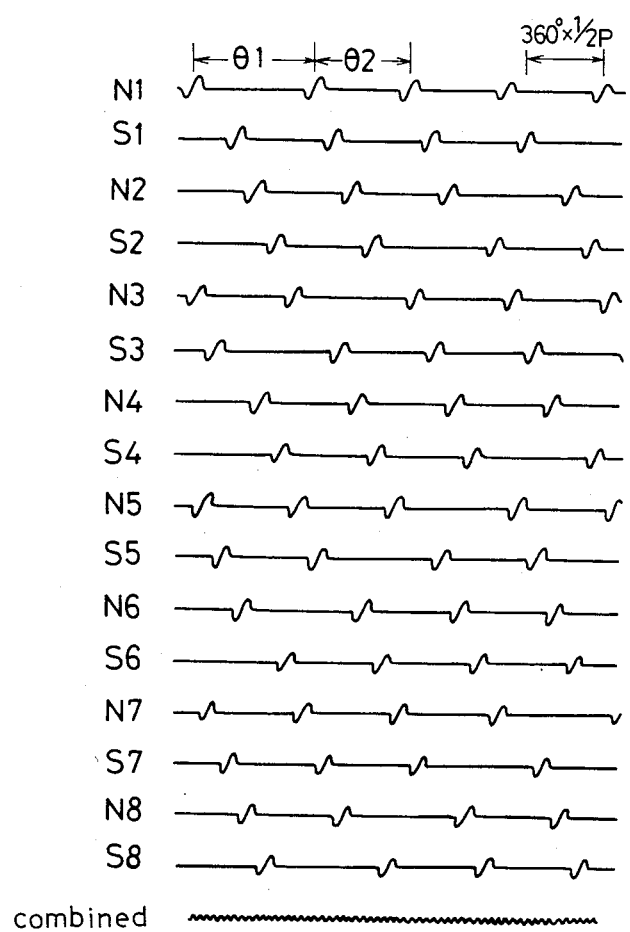
FIG. 5 is a diagram showing variations in the cogging forces of the magnetic poles of the field magnet of FIG. 4 and variations in the combined cogging force thereof.

Table 4 shows that the cogging angles are distributed at 192 positions per revolution. FIG. 5 shows variations in the cogging forces of the magnetic poles and variations in the combined cogging force thereof during $\frac{1}{8}$ of a revolution. In the diagram, the rotational angle is plotted as abscissa vs. the magnitute of cogging force as ordinate. Apparently, the angles of rotation where cogging occurs during the revolution of the poles are distributed, so that the combined cogging force is $\frac{1}{4}$ of the value for a conventional apparatus (with 16 poles and 12 slots), with the period of cogging reduced to $\frac{1}{4}$ of the conventional period. Thus, the adjacent cogging forces are offset to give a reduced force.

FIGS. 6 (a) to (c) are vector diagrams. The vector represents the amount of magnetic flux of the field magnet 1 interlinked with the armature winding of each phase multiplied by the number of turns of the winding. FIG. 6 (a) represents the conventional case of FIG. 11. FIG. 6 (b) represents the case wherein four divided windings serve as-the windings for each phase and are formed on the salient poles of the armature cores of FIG. 4 in the conventional manner. FIG. 6 (c) represents the embodiment of FIG. 4. In these drawings, one arrow represents the product of the number of turns of one divided winding multiplied by the amount of magnetic flux of the field magnet 1 interlinked with the winding. Each of FIGS. 6 (a) and (b) shows the sum of four vectors since the armature windings for each phase are four divided windings. FIG. 6 (c) shows the sum of three vectors since the armature windings for each phase are three divided windings. When four divided windings serve as the armature windings of each phase, the product of the number of turns of the divided winding multiplied by the amount of magnetic flux of each pole of the field magnet 1 is taken as 1, and the size of the arrow represents a ratio relative to 1. The numerical value under each arrow shows the ratio of the effective amount. The direction of the arrow represents a difference in phase.

The drawings show that in the case of FIG. 6 (a) in which the salient poles of the armature core are at an equal pitch, the sum of the vectors is 3.464 but that in the case of FIG. 6 (b) in which the salient poles are at different pitches as seen in FIG. 1, and four divided windings serve as the armature windings for one phase and are wound in the same direction around the poles concerned which are at a 3-slot pitch, the sum of the vectors is 3.318 and smaller than that shown in FIG. 6 (a) to indicate a reduced efficiency, while the cogging characteristics are those shown in FIG. 5.

In the case of the present embodiment shown in FIG. 6 (c), when the armature windings are the same as those in the conventional apparatus in the total number of conductors, the number of divided windings is smaller, so that the number of turns of each divided winding is 12/9 times the conventional. The sum of vectors is therefore 3.632 and is 4.8% greater than that in FIG. 6 (a), hence a higher efficiency.

In this case, the pitch angle $\theta1$ of the opposite slots forming the first salient pole and the pitch angle $\theta2$ of the opposite slots forming the second salient pole are calculated generally from Equations (1) and (2).

Figure 7:
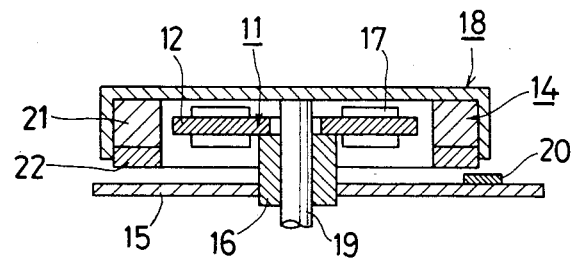
FIG. 7 is a view in section showing a brushless motor according to a fifth embodiment of the invention.

FIG. 7 is a view in vertical section showing a brushless motor according to a fifth embodiment of the invention.

Figure 8:
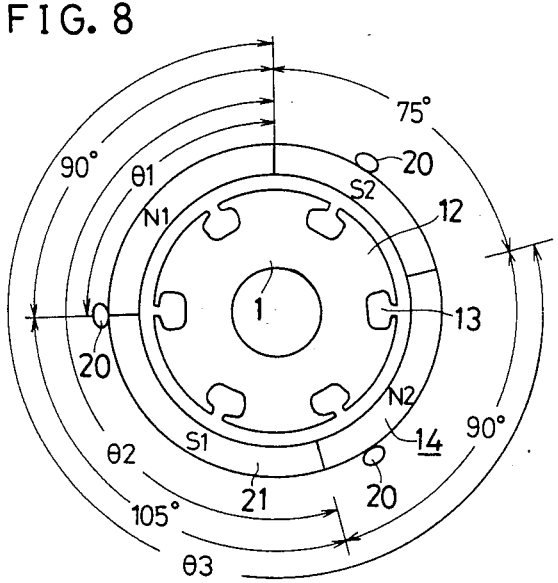
FIG. 8 is a schematic front view showing the arrangement of armature core and multipole magnet of FIG. 7.
Figure 9:
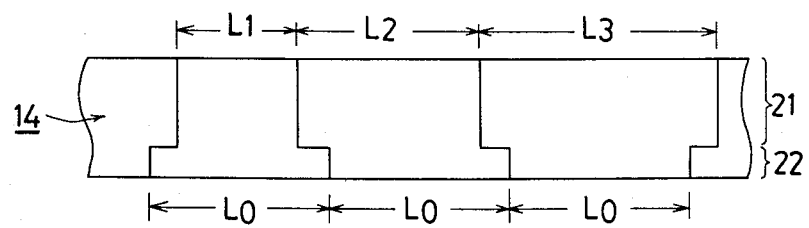
FIG. 9 is a fragmentary development showing the mode of magnetization of the multipole magnet shown in FIG. 7.

A stator 15 has a bearing portion 16 supporting an armature magnetic core 11. The core 11 is made of a highly magnetic material. As seen in FIG. 8, salient poles 12 of equal width are formed along the periphery of the core 11. A slot 13 is formed between each two adjacent salient poles 12.

The armature core 11 has three-phase armature windings 17 (not shown in FIG. 8) which include two divided windings for each phase. Each divided winding is provided on one salient pole 12. The divided windings of the same phase are provided on the opposed pair of salient poles, which are at a three-slot pitch, to give the same polarity and are connected together in series.

A rotor 18 has an annular multipole magnet 14 surrounding the salient poles 12, with a clearance formed between the magnet and the outer ends of the salient poles 12. The rotor has a rotor shaft 19 rotatably supported by the bearing portion 16.

The stator 15 has three position sensors 20, such as Hall-effect devices, arranged at an equal angular spacing and opposed to the magnet 14.

The multipole magnet 14 comprises two layers, i.e., first and second pole portions 21 and 22. The first pole portion 21 is magnetized over different lengths L1, L2, L3 (L1≠L2≠L3 . . .) to oppose the poles 12. The second pole portion 22 opposed to the position sensors 20 is magnetized over equal length (angles) L0.

When the brushless motor has three phases, six slots and four poles, the first pole portion 21 comprises a first magnetic pole N1 extending over an angle of 90 degrees, a second magnetic pole S2 over 105 degrees, a third magnetic pole N2 over 90 degrees and a fourth magnetic pole S2 over 75 degrees.

The second pole portion 22 has magnetic poles extending over equal angles of 90 degrees.

When the rotor 18 rotates by changing over the armature windings 17, the positions where cogging occurs are all different as listed in Table 5. The armature windings are changed over based on detection signals from the position sensors 20. Such rotational drive mechanism is already known and will not be described or illustrated.

Table 5 indicates that when the angles through which the first to fourth magnetic poles N1 to S2 extend are suitably determined, two or more cogging phenomena will not occur at the same time but are distributed with respect to time when the multipole magnet 14 rotates.

Figure 10:
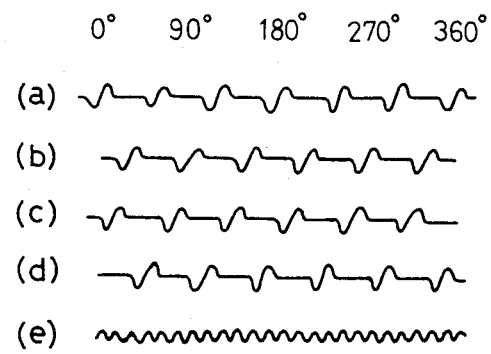
FIG. 10 is a diagram showing the cogging characteristics of the brushless motor of FIG. 7.

This is illustrated in FIG. 10 showing the cogging characteristics. Although the magnetic poles N1, S1, N2 and S2 produce cogging as shown in FIGS. 10 (a) to (d) as in the conventional apparatus, cogging phenomena do not occur at the same time, so that the combined cogging is lower in level and shorter in period as seen in FIG. 10 (e).

Moreover, when the multipole magnet 14 rotates in which the second pole portion 22 is magnetized over equal angles, the position sensors 20 produce regular detection signals to properly control the rotation.

According to the present embodiment, simultaneous occurrence of cogging phenomena is avoidable by unevenly magnetizing the first pole portion 21 of the magnet 14 in the following manner.

When the brushless motor has six slots 3 and four-pole magnet 14, suppose the first magnetic pole N1 extends over an angle of $\theta1$, the first and second poles N1 and S1 over an angle of $\theta2$, the first to third poles N1, S1 and N2 over an angle of $\theta3$. The angles T1 at which cogging occurs between the first magnetic pole N1 and the slots 13 with the rotation of the magnet 14 are given by:

$$T1 = (360°/6) \times Kn$$

in which the figures of 0 to 5 are substituted for Kn one after another in corresponding relation to the slot numbers.

The angles T2 at which cogging occurs between the second pole S1 and the slots 13 are given by:

$$T2 = (360°/6) \times Kn + \theta1$$

in which the figures of 0 to 5 are substituted for Kn successively.

The angles T3 at which cogging occurs between the third pole N2 and the slots 13 are given by:

$$T3 = (360°/6) \times Kn + \theta2$$

The angles T4 at which cogging occurs between the fourth pole S2 and the slots are similarly given by:

$$T4 = (360°/6) \times Kn + \theta3$$

$\theta m$ is so determined that the angles T1 to T4 thus obtained from the above equations by successively substituting the slots numbers or predetermined angle values for Kn or $\theta m$ will be different.

The values in Table 5 are obtained when the following values are used for $\theta$ to $\theta3$.
 $\theta1 = 90$ degrees
 $\theta2 = 195$ degrees
 $\theta3 = 285$ degrees Thus, combined cogging can be made to occur with uniform distribution.

When the number of magnetic poles of the field magnet is 2P and the number of salient poles of the armature is Q, cogging phenomena can be uniformly distributed generally by changing each magnetic pole of the field by an angle of 360/(2P·Q) multiplied by an integer from an angle 360/2P.

With the embodiment wherein the number of magentic poles is 4 and the number of salient poles is 6, the second and fourth magnetic poles S1 and S2 are made to differ by 15 degrees.

When the number of magnetic poles of the field magnet is 6 and the number of salient poles of the armature is 9, the magnetic poles of the field magnet are so sized as to extend over angles of 60 degrees, 53.3 degrees, 73.4 degrees, 60 degrees, 46.6 degrees and 66.7 degrees successively, whereby cogging phenomena can be distributed when combined.

However, when it is desired only to diminish the combined cogging force, cogging need not occur at an equal time interval provided that cogging phenomana do not occur at the same time.

With the brushless motor of the present invention, the first and second pole portions 21 and 22 need to be an integral piece but may be prepared as separate pieces, which may be adhered together.

Although each of the foregoing embodiments is a brushless motor wherein the field magnet serves as a rotor, the invention can be embodied as an apparatus wherein the field magnet serves as a stator, and the armature as a rotor. The position of the field magnet is not limited to the outside of the armature but can be positioned inside the inner periphery of the armature.

Furthermore, the present invention can be embodied as an apparatus wherein the armature and the field magnet are opposed to each other axially thereof, with a gap provided therebetween.

TABLE 1

| | | | | | | Rotational angle (deg) | |
|---|---|---|---|---|---|---|---|
| $N_1$ | $S_1$ | $N_2$ | $S_2$ | $N_3$ | $S_3$ | $N_4$ | $S_4$ |
| 0 | 7.5 | 30 | 3.75 | 26.25 | 15 | 22.5 | 11.25 |
| 18.75 | 41.25 | 48.75 | 37.5 | 60 | 33.75 | 56.25 | 45 |
| 52.5 | 75 | 82.5 | 71.25 | 78.75 | 67.5 | 90 | 63.75 |
| 86.25 | 93.75 | 116.25 | 105 | 112.5 | 101.25 | 108.75 | 97.5 |
| 120 | 127.5 | 150 | 123.75 | 146.25 | 135 | 142.5 | 131.25 |
| 138.75 | 161.25 | 168.75 | 157.5 | 180 | 153.75 | 176.25 | 165 |
| 172.5 | 195 | 202.5 | 191.25 | 198.75 | 187.5 | 210 | 183.75 |
| 206.25 | 213.75 | 236.25 | 225 | 232.5 | 221.25 | 228.75 | 217.5 |
| 240 | 247.5 | 270 | 243.75 | 266.25 | 255 | 262.5 | 251.25 |
| 258.75 | 281.25 | 288.75 | 277.5 | 300 | 273.75 | 296.25 | 285 |
| 292.5 | 315 | 322.5 | 311.25 | 318.75 | 307.5 | 330 | 303.75 |
| 326.25 | 333.75 | 356.25 | 345 | 352.5 | 341.25 | 348.75 | 337.5 |

TABLE 2

| | | | | | | | Rotational angle (deg) | |
|---|---|---|---|---|---|---|---|---|
| $N_1$ | $S_1$ | $N_2$ | $S_2$ | $N_3$ | $S_3$ | $N_4$ | $S_4$ | $N_5$ | $S_5$ |
| 0 | 19.2 | 4.8 | 12 | 9.6 | 16.8 | 2.4 | 21.6 | 7.2 | 14.4 |
| 33.6 | 40.8 | 26.4 | 45.6 | 31.2 | 38.4 | 24 | 43.2 | 28.8 | 36 |
| 55.2 | 62.4 | 48 | 67.2 | 52.8 | 60 | 57.6 | 64.8 | 50.4 | 69.6 |
| 76.8 | 84 | 81.6 | 88.8 | 74.4 | 93.6 | 79.2 | 86.4 | 72 | 91.2 |
| 98.4 | 117.6 | 103.2 | 110.4 | 96 | 115.2 | 100.8 | 108 | 105.6 | 112.8 |
| 120 | 139.2 | 124.8 | 132 | 129.6 | 136.8 | 122.4 | 141.6 | 127.2 | 134.4 |
| 153.6 | 160.8 | 146.4 | 165.6 | 151.2 | 158.4 | 144 | 163.2 | 148.8 | 156 |
| 175.2 | 182.4 | 168 | 187.2 | 172.8 | 180 | 177.6 | 184.8 | 170.4 | 189.6 |
| 196.8 | 204 | 201.6 | 208.8 | 194.4 | 213.6 | 199.2 | 206.4 | 192 | 211.2 |
| 218.4 | 237.6 | 223.2 | 230.4 | 216 | 235.2 | 220.8 | 228 | 225.6 | 232.8 |
| 240 | 259.2 | 244.8 | 252 | 249.6 | 256.8 | 242.4 | 261.6 | 247.2 | 254.4 |
| 273.6 | 280.8 | 266.4 | 285.6 | 271.2 | 278.4 | 264 | 283.2 | 268.8 | 276 |
| 295.2 | 302.4 | 288 | 307.2 | 292.8 | 300 | 297.6 | 304.8 | 290.4 | 309.6 |
| 316.8 | 324 | 321.6 | 328.8 | 314.4 | 333.6 | 319.2 | 326.4 | 312 | 331.2 |
| 338.4 | 327.6 | 343.2 | 350.4 | 336 | 355.2 | 340.8 | 348 | 345.6 | 352.8 |

TABLE 3

| | | | | | | Rotational angle (deg) | |
|---|---|---|---|---|---|---|---|
| $N_1$ | $S_1$ | $N_2$ | $S_2$ | $N_3$ | $S_3$ | $N_4$ | $S_4$ |
| 0 | 22.5 | 3.75 | 26.25 | 7.5 | 15 | 11.25 | 18.75 |
| 41.25 | 48.75 | 30 | 52.5 | 33.75 | 56.25 | 37.5 | 45 |
| 67.5 | 75 | 71.25 | 78.75 | 60 | 82.5 | 63.75 | 86.25 |
| 93.75 | 116.25 | 97.5 | 105 | 101.25 | 108.75 | 90 | 112.5 |
| 120 | 142.5 | 123.75 | 146.25 | 127.5 | 135 | 131.25 | 138.75 |
| 161.25 | 168.75 | 150 | 172.5 | 153.75 | 176.25 | 157.5 | 165 |
| 187.5 | 195 | 191.25 | 198.75 | 180 | 202.5 | 183.75 | 206.25 |
| 213.75 | 236.25 | 217.5 | 225 | 221.25 | 228.75 | 210 | 232.5 |
| 240 | 262.5 | 243.75 | 266.25 | 247.5 | 255 | 251.25 | 258.75 |
| 281.25 | 288.75 | 270 | 292.5 | 273.75 | 296.25 | 277.5 | 285 |
| 307.5 | 315 | 311.25 | 318.75 | 300 | 322.5 | 303.75 | 326.25 |
| 333.75 | 356.25 | 337.5 | 345 | 341.25 | 348.75 | 330 | 352.5 |

TABLE 4

| | | | | Rotational angle (deg) | |
|---|---|---|---|---|---|
| $N_1$ | $S_1$ | $N_2$ | $S_2$ | $N_3$ | $S_3$ |
| 0 | 13.125 | 18.75 | 24.375 | 1.825 | 7.5 |
| 35.625 | 41.25 | 46.875 | 52.5 | 30 | 43.125 |

TABLE 4-continued

| 63.75 | 69.375 | 75 | 88.125 | 65.625 | 71.25 |
|---|---|---|---|---|---|
| 91.875 | 97.5 | 110.625 | 116.25 | 93.75 | 99.375 |
| 120 | 133.125 | 138.75 | 144.375 | 121.875 | 127.5 |
| 155.625 | 161.25 | 166.875 | 172.5 | 150 | 163.125 |
| 183.75 | 189.375 | 195 | 208.125 | 185.625 | 191.25 |
| 211.875 | 217.5 | 230.625 | 236.25 | 213.75 | 219.375 |
| 240 | 253.125 | 258.75 | 264.375 | 241.875 | 247.5 |
| 275.625 | 281.25 | 286.875 | 292.5 | 270 | 283.125 |
| 303.75 | 309.375 | 315 | 328.125 | 305.625 | 311.25 |
| 331.875 | 337.5 | 350.625 | 356.25 | 333.75 | 339.375 |

| | | | | Rotational angle (deg) | |
|---|---|---|---|---|---|
| $N_4$ | $S_4$ | $N_5$ | $S_5$ | $N_6$ | $S_6$ |
| 20.625 | 26.25 | 3.75 | 9.375 | 15 | 28.125 |
| 48.75 | 54.375 | 31.875 | 37.5 | 50.625 | 56.25 |
| 76.875 | 82.5 | 60 | 73.125 | 78.75 | 84.375 |
| 105 | 118.125 | 95.625 | 101.25 | 106.875 | 112.5 |
| 140.625 | 146.25 | 123.75 | 129.375 | 135 | 148.125 |
| 168.75 | 174.375 | 151.875 | 157.5 | 170.625 | 176.25 |
| 196.875 | 202.5 | 180 | 193.125 | 198.75 | 204.375 |
| 225 | 238.125 | 215.625 | 221.25 | 226.875 | 232.5 |
| 260.625 | 266.25 | 243.75 | 249.375 | 255 | 268.125 |
| 288.75 | 294.375 | 271.875 | 277.5 | 290.625 | 296.25 |
| 316.875 | 322.5 | 300 | 313.125 | 318.75 | 324.375 |
| 345 | 358.125 | 335.625 | 341.25 | 346.875 | 352.5 |

| | | Rotational angle (deg) | |
|---|---|---|---|
| $N_7$ | $S_7$ | $N_8$ | $S_8$ |
| 5.625 | 11.25 | 16.875 | 22.5 |
| 33.75 | 39.375 | 45 | 58.125 |
| 61.875 | 67.5 | 80.625 | 86.25 |
| 90 | 103.125 | 108.75 | 114.375 |
| 125.625 | 131.25 | 136.875 | 142.5 |
| 153.75 | 159.375 | 165 | 178.125 |
| 181.875 | 187.5 | 200.625 | 206.25 |
| 210 | 223.125 | 228.75 | 234.375 |
| 245.625 | 251.25 | 256.875 | 26.25 |
| 273.75 | 279.375 | 285 | 298.125 |
| 301.875 | 307.5 | 320.625 | 326.25 |
| 330 | 343.125 | 348.75 | 354.375 |

TABLE 5

| | | | | | Rotational angle (deg) | |
|---|---|---|---|---|---|---|
| | $Kn = 0$ | $Kn = 1$ | $Kn = 2$ | $Kn = 3$ | $Kn = 4$ | $Kn = 5$ |
| T1 | 0 | 60 | 120 | 180 | 240 | 300 |
| T2 | 90 | 150 | 210 | 270 | 330 | 390 (30) |
| T3 | 195 | 255 | 315 | 375 (15) | 435 (75) | 495 (135) |
| T4 | 285 | 345 | 405 (45) | 465 (105) | 525 (165) | 585 (225) |

What is claimed is:

1. A rotary electric apparatus comprising an armature including an armature core and armature windings, the armature core having an odd number of first salient poles and a plurality of second salient poles provided by slots formed therein as distributed on a circumferential surface, the first salient poles being equal in number to the number of phases of the armature windings and equidistantly spaced on the circumference, the second salient poles being arranged at an equal spacing between each two adjacent first salient poles, the slots on the opposite sides of each first salient pole being different in pitch angle from the slots on the opposite sides of each second salient pole, the armature windings being formed around at least the second salient poles; a field magnet having different magnetic poles formed alternately at an equal spacing and arranged on a circumference to oppose the ends of the first and second salient poles; and a shaft supporting one of the armature and the field magnet rotatably relative to the other and holding the salient poles of the armature opposed to the field magnet with a predetermined gap provided therebetween, the pitch angle formed by the slots on the opposite sides of each first salient pole and the pitch angle formed by the slots on the opposite sides of each second salient pole being determined so that the center of any other magnetic pole of the field magnet is not aligned with the center of any slot when the center of a magnetic pole of the field magnet is algined with the center of a slot during the rotation of the field magnet relative to the armature.

2. An apparatus as defined in claim 1 wherein the pitch angle $\theta 1$ of the slots on the opposite sides of the first salient pole is $$\theta 1 = 360 \times \left\{ \frac{1}{Z} \pm \left( \frac{1}{2PN} - \frac{1}{2PZ} \right) \right\} \text{ degrees,}$$

and the pitch angle $\theta 2$ of the slots on the opposite sides of the second salient pole is $$\theta 2 = 360 \times \left( \frac{1}{Z} \mp \frac{1}{2PZ} \right) \text{ degrees,}$$

wherein Z is the combined number of the first salient poles and the second salient poles, N is the number of phases of the armature windings, and 2P is the number of magnetic poles of the field magnet.

3. An apparatus as defined in claim 1 wherein the pitch angle $\theta 1$ of the slots on the opposite sides of the first salient pole is $$\theta 1 = 360 \times \frac{N \cdot P - 1}{2P \cdot N \cdot P} \text{ degrees,}$$

and the pitch angle $\theta 2$ of the slots on the opposite sides of the second salient pole is $$\theta 2 = 360 \times \frac{(2P - N) \cdot P + 1}{2P \cdot N \cdot P \cdot (p - 1)} \text{ degrees,}$$

wherein 2P is the number of magnetic poles of the field magnet, and N is the number of phases of the armature windings.

4. An apparatus as defined in claim 1 which is a brushless motor.

5. An apparatus as defined in claim 1 wherein the number of phases of the armature windings is 3, the number of magnetic poles of the field magnet is 8, the combined number of the first and second salient poles is 12, the pitch angle of the slots on the opopsite sides of the first salient pole is 41.25 degrees, and the pitch angle of the slots on the opposite sides of the second salient pole is 26.25 degrees.

6. An apparatus as defined in claim 1 wherein the number of phases of the armature windings is 3, the number of magnetic poles of the field magnet is 10, the combined number of the first and second salient poles is 15, the pitch angle of the slots on the opposite sides of the first salient poles is 33.6 degrees, and the pitch angle of the slots on the opposite sides of the second salient pole is 21.6. degrees.

7. A rotary electric apparatus comprising a field magnet having different magnetic poles arranged alternately at unequal spacing on a circumferential surface, an armature including an armature core having slots formed therein as distributed at an equal spacing on a circumferential surface opposed to the circumferential surface to provide salient poles between the slots, each of the salient poles having an armature winding wound therearound, and a shaft supoprting one of the armature and the field magnet rotatably relative to the other and holding the salient poles of the armature opposed to the field magnet with a predetermined gap provided therebetween, the center of any other magnetic pole of the field magnet being not aligned with the center of any slot of the armature when the center of a magnetic pole of the field magnet is aligned with the center of a slot of the armatures.

8. An apparatus as defined in claim 7 wherein when one magnetic pole of the field magnet moves from a predetermined position to each of the slots through an angle T, the angle $\theta m$ from the predetermined position to a magnetic pole just before said one magnetic pole in the direction of rotation is so selected that the angles T given by:

$$T = (360°/n) \times Kn + \theta m$$

wherein n is the number of slots, m is the number of magnetic poles of the field magnet, and Kn is a number corresponding to each slot number, all different from each other.

9. An apparatus as defined in claim 7 which is a brushless motor wherein the field magnet is a rotor.

10. An apparatus as defined in claim 9 wherein the field magnet has different magnetic poles arranged alternately at an equal pitch and provided on a field magnetic member, sensors being provided for detecting the position of the field magnetic member by detecting the magnetic field of each pole on the magnetic member.

11. An apparatus as defined in claim 2 wherein the number of phases of the armature windings is 3, the number of magnetic poles of the field magnet is 8, the combined number of the first and second salient poles is 12, the pitch angle of the slots on the opposite sides of the first salient pole is 41.25 degrees, and the pitch angle of the slots on the opposite sides of the second salient pole is 26.25 degrees.

12. An apparatus as defined in claim 3 wherein the number of phases of the armature winding is 3, the number of magnetic poles of the field magnet is 8, the combied number of the first and second salient poles is 12, the pitch angle of the slots on the opposite sides of the first salient pole is 41.25 degrees, and the pitch angle of the slots on the opposite sides of the second salient pole is 26.25 degrees.

13. An apparatus as defined in claim 4 wherein the number of phases of the armature windings is 3, the number of magnetic poles of the field magnet is 8, the combined number of the first and second salient poles is 12, the pitch angle of the slots on the opposite sides of the first salient pole is 41.25 degrees, and the pitch angle of the slots on the opposite sides of the second salient pole is 26.25 degrees.

14. An apparatus as defined in claim 2 wherein the number of phases of the aramture windings is 3, the number of magnetic poles of the field magnet is 10, the combined number of the first and second salient poles is 15, the pitch angle of the slots on the opposite sides of the first salient poles is 33.6 degrees, and the pitch angle of the slots on the opposite sides of the second salient pole is 21.6 degrees.

15. An apparatus as defined in claim 3 wherein the number of phases of the armature windings is 3, the number of magnetic poles of the field magnet is 10, the combined number of the first and second salient poles is 15, the pitch angle of the slots on the opposite sides of the first salient poles is 33.6 degrees, and the pitch angle of the slots on the opposite sides of the second salient pole is 21.6 degrees.

16. An apparatus as defined in claim 4 wherein the number of phases of the armature windings is 3, the number of magnetic poles of the field magnet is 10, the combined number of the first and second salient poles is 15, the pitch angle of the slots on the opposite sides of the first salient poles is 33.6 degrees, and the pitch angle of the slots on the opposite sides of the second salient pole is 21.6 degrees.

17. An apparatus as defined in claim 8 which is a brushless motor wherein the field magnet is a rotor.

* * * * *